(12) United States Patent
Carames (10) Patent No.: US 8,948,750 B1
(45) Date of Patent: Feb. 3, 2015

(54) LTE ROAMING APN ADAPTATION

(75) Inventor: Miguel A. Carames, Martinez, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/236,233

(22) Filed: Sep. 19, 2011

(51) Int. Cl.
*H04B 7/14* (2006.01)

(52) U.S. Cl.
USPC .......................................... 455/433; 455/418

(58) Field of Classification Search
None
See application file for complete search history.

(56) References Cited

U.S. PATENT DOCUMENTS

| | | | |
|---|---|---|---|
| 6,584,312 B1 * | 6/2003 | Morin et al. ................... | 455/433 |
| 7,624,266 B2 * | 11/2009 | Gabor ........................... | 713/168 |
| 8,326,283 B1 * | 12/2012 | Hursey et al. ............... | 455/432.1 |
| 2007/0298788 A1 * | 12/2007 | Corson et al. ................ | 455/433 |
| 2008/0165751 A1 * | 7/2008 | Soininen et al. ............. | 370/338 |
| 2010/0165960 A1 * | 7/2010 | Richardson .................. | 370/338 |
| 2010/0323690 A1 * | 12/2010 | Shaw ............................ | 455/425 |
| 2011/0159895 A1 * | 6/2011 | Arzelier et al. .............. | 455/466 |
| 2011/0195710 A1 * | 8/2011 | Nas et al. ..................... | 455/432.3 |
| 2011/0217978 A1 * | 9/2011 | Horn ............................ | 455/433 |
| 2011/0223887 A1 * | 9/2011 | Rune et al. ..................... | 455/411 |
| 2012/0028626 A1 * | 2/2012 | Marocchi et al. .......... | 455/422.1 |
| 2012/0100849 A1 * | 4/2012 | Marsico ..................... | 455/432.1 |
| 2012/0124220 A1 * | 5/2012 | Zhou et al. .................... | 709/227 |
| 2012/0158977 A1 * | 6/2012 | Zhou et al. .................... | 709/228 |
| 2013/0188527 A1 * | 7/2013 | Yang et al. ..................... | 370/259 |
| 2013/0279401 A1 * | 10/2013 | Sander et al. ................. | 370/328 |

* cited by examiner

*Primary Examiner* — Rafael Pérez-Gutiérrez
*Assistant Examiner* — Frank Donado (57) ABSTRACT

A method for providing roaming profiles to a VPMN includes receiving, at a HPMN, an authentication request to authorize a mobile station in the VPMN. The HPMN transmits, to the VPMN, an authorization answer in response to the authentication request. Once the VPMN determines that the mobile station is authorized to operate in the VPMN, the HPMN receives a visited profile request for the mobile station. The request is transmitted from the VPMN to the HPMN. The HPMN retrieves a home profile for the mobile station in the HPMN. A device in the HPMN modifies, based on an agreement between the VPMN and HPMN and other policies, the home profile to a visited profile. The modification occurs in the same, or in a different, device as the device from which the home profile was retrieved. The visited profile is transmitted to the VPMN in response to the request.

18 Claims, 5 Drawing Sheets

LTE ROAMING APN ADAPTATION

TECHNICAL FIELD

The present subject matter relates to techniques and equipment to perform APN adaptation in LTE roaming scenarios at a Diameter Edge Agent.

BACKGROUND

Currently in networks using the 3GPP (3rd Generation Partnership Project) standard, information regarding a user of a mobile station can be stored in a Home Location Register (HLR). In general, the HLR can be a database of user (subscriber) information, i.e., customer profiles, used in mobile (cellular) networks such as GSM (Global System for Mobile Communications), TDMA (Time Division Multiple Access), and CDMA (Code Division Multiple Access) networks. The HLR contains user information such as account information, account status, user preferences, features subscribed to by the user, user's current location, etc.

In the Long Term Evolution (LTE) architecture (for 3G and 4G networks) the HLR evolved to a Home Subscriber Server (HSS). Note, that depending on the architecture, the terms have similar meanings. The user profile in the HSS includes, among many other parameters, the list of Access Point Names (APNs) the user is permitted to use. APNs are typically used to segregate different types of traffic due to Quality of Service (QoS), security, billing or other considerations.

For example, in the GSM Association LTE Roaming specifications, separate APNs are recommended for IP Multimedia Subsystem (IMS) traffic and for general internet traffic. Network providers may segregate the traffic further, using different APNs for administrative traffic, wall-gardened applications (i.e. the provider's own applications and content), etc.

When the user is in her Home Public Mobile Network (HPMN), the network serviced by the network provider in which the user has her subscription, the network provider can control whether a given APN can be used by the user. The same can hold true if the user is roaming into a Visited Public Mobile Network (VPMN). However, even if a particular APN is not to be used while roaming, the HSS includes that APN in the subscriber profile provided to the VPMN. In roaming scenarios, the HSS in the HPMN provides this information to a Mobility Management Entity (MME) in the VPMN.

The MME is a control-node for the LTE access-network, in that it can be a single point (or "node") within the network that integrates numerous core functions and control over network flow, load sharing, etc. It can be responsible for tracking, paging, and retransmission procedures to the user's mobile station. The MME can also be involved in the user's mobile station activation/deactivation process and is also responsible for authenticating the user when the user is roaming, by interacting with the HSS.

Currently, to allow or restrict a user's access while roaming in a VPMN, the user's profile in the HSS must be edited to provide this information. This can be a tedious process given the number of users subscribed to a particular network and is compounded by the fact that a network provider can have over 500 agreements for roaming in other networks.

Further, while updating the relevant user profiles in the HSS can be automated there are drawbacks in terms of the amount of memory at the HSS to store the differing profiles and parameters and the cost associated with the memory and updates. Keeping the various profiles stored in the HSS can impact the performance of the database as well.

Hence a need exists to provide a mechanism to perform APN adaptation in LTE roaming scenarios without editing and storing individual subscriber profile provisioned at the Home Subscriber Server.

SUMMARY

The teachings herein alleviate one or more of the above noted problems with storing and transmitting roaming profiles to VPMNs. An example of a method for providing roaming profiles to the VPMN includes receiving, at the HPMN, an authentication request to authorize the mobile station in the VPMN. The HPMN then transmits, to the VPMN, an authorization answer in response to the authentication request. In this example, the mobile station is authorized to roam in the VPMN. Alternately, the HPMN can deny the request.

Once authorized the HPMN receives a visited profile request for the mobile station located in the VPMN. The request is transmitted from the VPMN. The HPMN retrieves a home profile for the mobile station in the HPMN. A system in the HPMN modifies the home profile to a visited profile. The visited profile is then transmitted to the VPMN. In another example, the visited profile request contains the authentication request and the visited profile is transmitted to the VPMN along with the authorization answer. In this way, the roaming profile is provided at the time the mobile station is being authorized on the VPMN.

In an example, the visited profile request can contain a visited network identifier. This identifier is unique to the particular VPMN so the HPMN knows how to modify the home profile. The modifying can include accessing parameters based on the visited network identifier and converting the home profile based on the parameters.

As noted previously, the parameters can be based on an agreement between the HPMN and the VPMN. In an example, the parameters can be at least a list of Access Point Names (APNs).

Further to the above example, the HPMN has the HSS storing the home profile and the home Diameter edge agent communicates with the HSS. The VPMN includes the MME which transmits the visited profile request and the visited Diameter edge agent. The visited Diameter edge agent communicates with the MME and the home Diameter edge agent to allow for the flow of the messages, requests, and answers. The communication can be in the S6a protocol. In the HPMN, it's the HSS that performs the retrieving step and it can be one of the HSS or the home Diameter edge agent that performs the modification.

Further, an article of manufacture can include at least one machine readable storage medium and programming instructions embodied in said at least one medium for execution by one or more computers. The programming can configure one or more computers to be capable of performing functions for providing information to the VPMN. The functions include receiving a visited profile request for a mobile station in the VPMN. At the HPMN, retrieving a home profile for the mobile station in the HPMN, and modifying the home profile into the visited profile. The visited profile is then transmitted to the VPMN.

Additional programming instructions can be receiving an authentication request to authorize the mobile station in the VPMN and transmitting an authorization answer in response to the authentication request. In another example, the visited profile request contains the authentication request and the visited profile is transmitted to the VPMN along with the authorization answer. In this way, the roaming profile is provided at the time the mobile station is being authorized on the VPMN.

Furthermore, the visited profile request can contain a visited network identifier, and the programming instructions modifying the home profile can be modified based on that identifier. The programming instructions access parameters based on the visited network identifier and convert the home profile based on the parameters. The parameters can be based on an agreement between the HPMN and the VPMN. In one example, the parameters can be at least a list of Access Point Names (APNs).

An APN is a configurable network identifier used by the mobile station when connecting to a provider's network. The HPMN or VPMN can use the APN to determine what type of network connection should be created, what security methods should be used, and to define the type of service (e.g. connection to wireless application protocol (WAP) server, multimedia messaging service (MMS)). More specifically, the APN identifies an IP Packet Data Network (PDN) that the mobile station wants to communicate with.

The article of manufacture can include surrounding hardware, where the home network can include at least a Home Subscriber Server (HSS) storing the home profile and a home Diameter edge agent communicating with the HSS. The visited network can include at least a Mobility Management Entity (MME) transmitting the visited profile request and a visited Diameter edge agent, communicating with one of the MME and the home Diameter edge agent. At least one of the HSS and the home Diameter edge agent performs the modifying of the home profile.

As a result, only one profile needs to be stored, the home network profile. Also, since the home profile is modified by parameters, the parameters can be changed easily as the relationship between the HPMN and VPMN change.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to techniques and equipment to perform APN adaptation in LTE roaming scenarios at a Diameter edge agent (also referred to as a Diameter agent or Diameter proxy).

Figure 1:
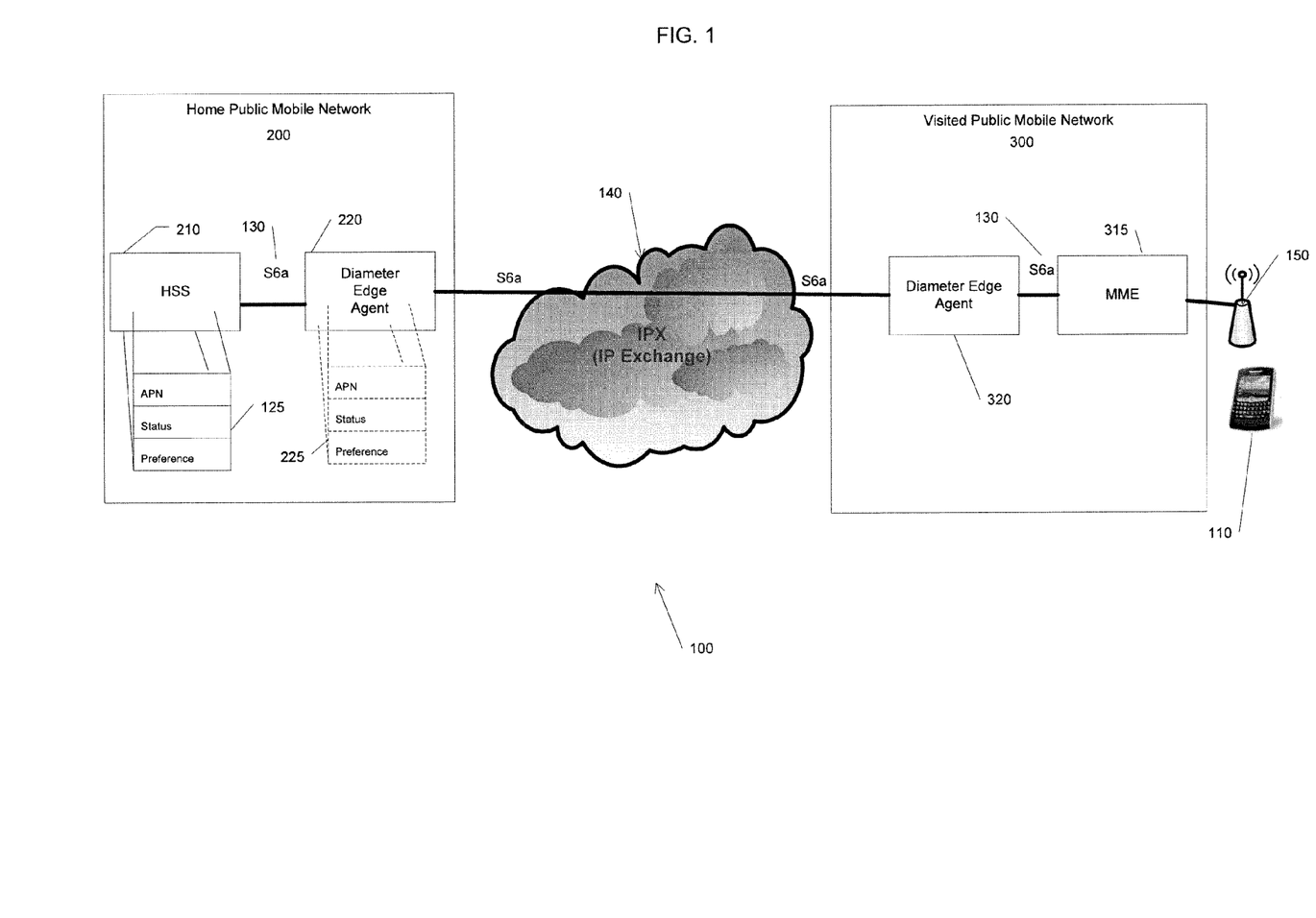
FIG. 1 is a functional block diagram describing a simplified network diagram for roaming from a HPMN to a VPMN.
Figure 4:
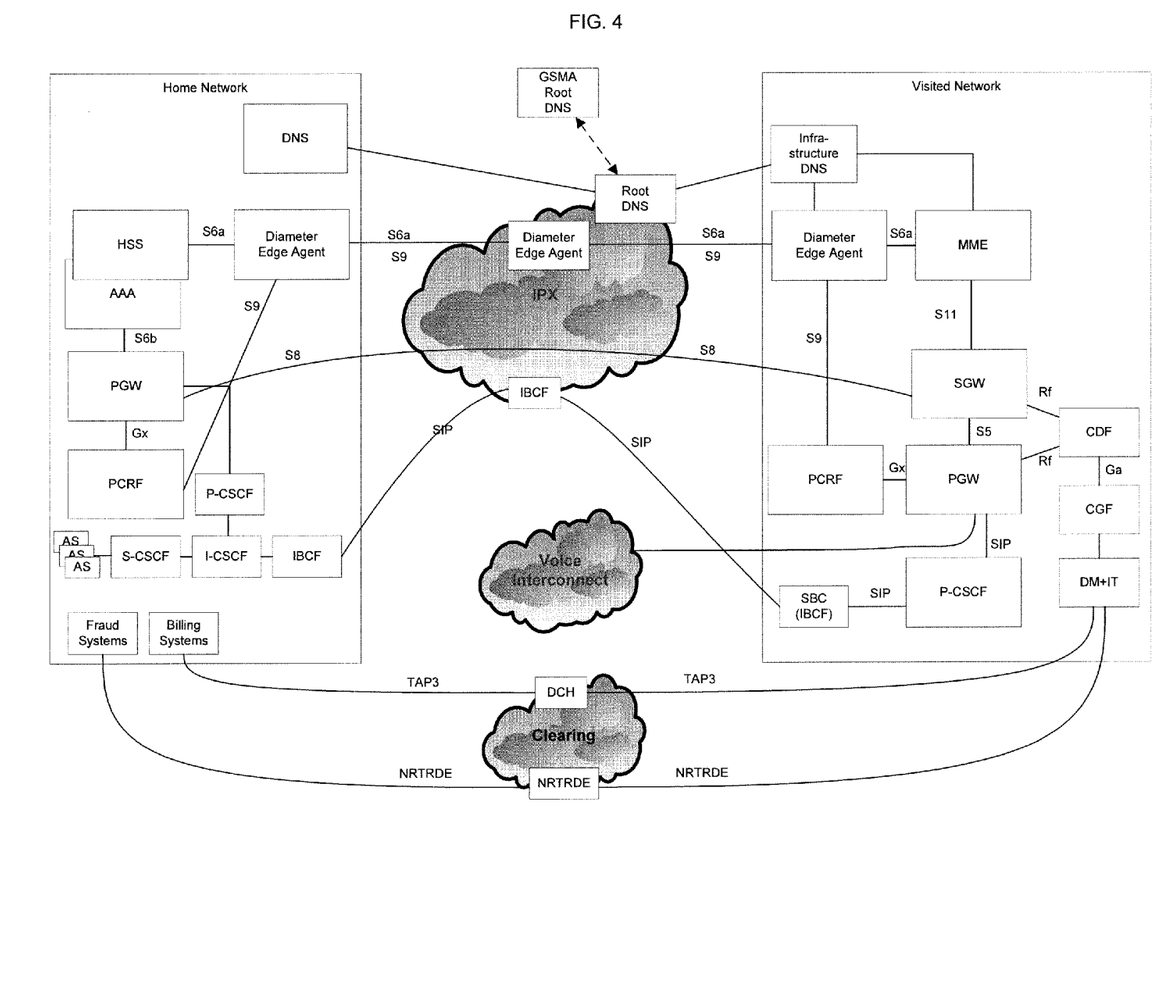
FIG. 4 is a functional block diagram illustrating a complete network diagram for the HPMN and the VPMN.

Reference now is made in detail to the examples illustrated in the accompanying drawings and discussed below. FIG. 1 illustrates a functional block diagram describing a simplified network diagram for a user's mobile station 110 roaming from a HPMN 200 to a VPMN 300. A simplified overall network 100 is just a portion of a complete network illustrated at FIG. 4. Both the HPMN 200 and the VPMN 300 can have all of the features, hardware, and systems of other networks, however, in this example, only the relevant portions of the network are illustrated in FIG. 1. HPMN 200 can have a HSS 210 which, as described above, can contain user information such as account information, account status, user preferences, features subscribed to by the user, user's current location, and allowable APNs. In this example, the HSS 210 contains the user profile 125 related to the mobile station 110. The HSS 210 communicates with a home network Diameter edge agent 220 using an S6a protocol 130. As discussed below, a roaming user profile 225 is created in the HPMN 200 upon request from the VPMN 300. The roaming user profile 225 is a modification of the user profile 125.

The Diameter edge agent 220, 320 is a roaming agent utilizing the Diameter protocol. The Diameter protocol is a next generation Authentication, Authorization, and Accounting (AAA) protocol for computer networks. The protocol facilitates the exchange of AAA related information within the network. A more complete description of the Diameter protocol can be found in a Request for Comments (RFC) 3588 (as published by the Internet Society, September 2003—which can be found at http://www.ietf.org/rfc/rfc3588.txt) which is incorporated herein by reference in its entirety. The roaming agent is a device in the network that facilitates the roaming capabilities of the provider's network. The Diameter edge agent 220, 320 can be considered as the only point of contact into and out of a network (either HPMN or VPMN) at the Diameter application level. As illustrated FIG. 4, communications between the HPMN 200 and the VPMN 300 can pass through multiple Diameter edge agents.

S6a protocol 130 enables transfer of profile and authentication data for authenticating/authorizing user access between the HSS 210 of the HPMN 200 and the MME 315 of the VPMN 300 (as described above and below). The S6a protocol messages 130, in the simplified example of FIG. 1, can pass from the HSS 210 to the home Diameter edge agent 220, over the network 140 to the VPMN's 300 Diameter edge agent 320 and to the MME 315.

The MME 315 can be responsible, among other tasks, for authenticating the user when the user is roaming by interacting with the HSS 210. In the simplified example, the MME 315 also communicates with the base station/antenna 150 to receive information and requests from the mobile station 110.

Figure 2:
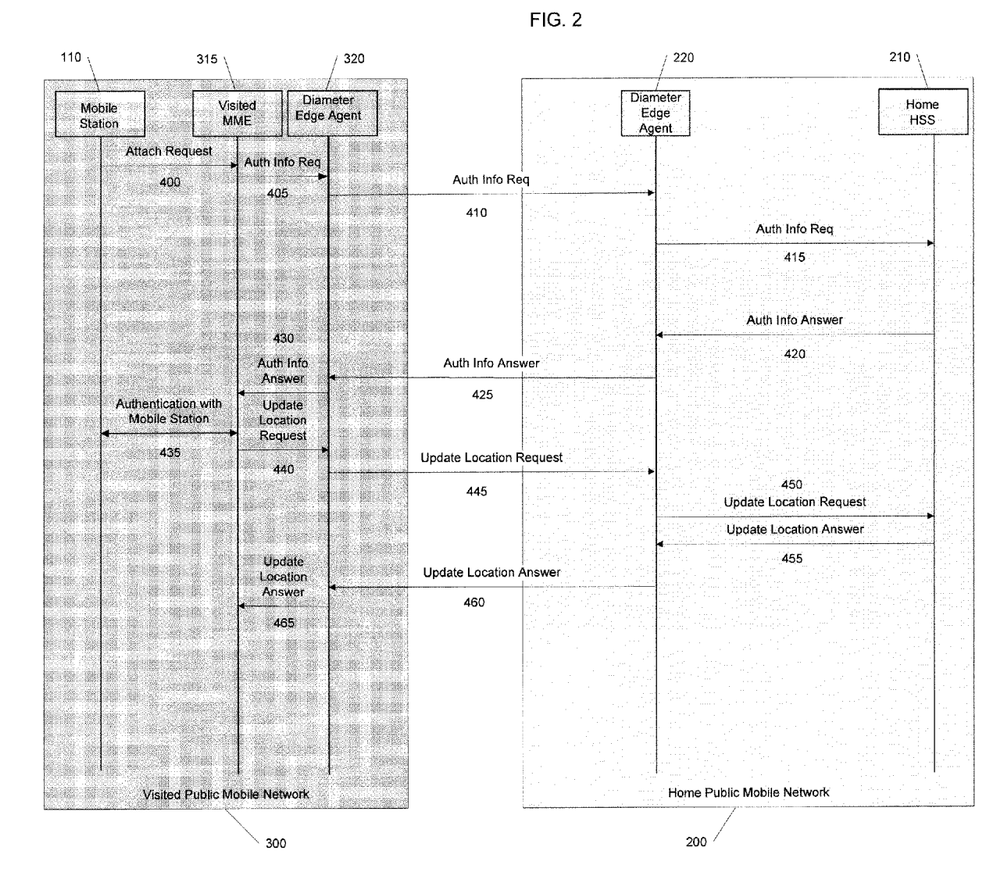
FIG. 2 is a message flow diagram authorizing a user's mobile station in a roaming area.

FIG. 2 illustrates an example of an authorization message flow diagram when the user's mobile station 110 is roaming, i.e., communicating with base stations 150 within a VPMN 300. FIG. 2 illustrates the example when the roaming is allowed. When the mobile station 110 wants authorization to use the VPMN 300 (i.e., roam), it sends an attachment request 400 through the base station 150 to the visited MME 315. The MME 315 determines that the mobile station 110 is not a subscriber of its particular network and that it needs authorization to allow the mobile station 110 access to the network. The MME 315 sends an authorization information request 405 to the visited Diameter edge agent 320. The visited Diameter edge agent 320 then communicates 410 with the home Diameter edge agent 220 on the HPMN 200. This communication is typically over the network 140, which can use an internetwork packet exchange (IPX). On the HPMN 200 side, the home Diameter edge agent 220 communicates the authorization information request 415 to the HSS 210.

The HSS 210 then reviews the request and transmits an authorization information answer 420 back to the home Diameter edge agent 220. In this example, the user is authorized to roam in the VPMN 300. The home Diameter edge agent 220 then transmits the authorization information answer 425 to the visited Diameter edge agent 320 who then transmits the answer 430 to the MME 315. The MME 315, through the base station 150, authenticates the mobile station 110 in a back and forth communication 435. The authentication procedure between the mobile station 110 and the MME 435 can involve multiple messages per current 3GPP standards (Authentication Request/Response, Security Mode Command/Complete, etc). The content and frequency of these messages are known to those of ordinary skill in the art.

Once the mobile station 110 is authenticated, the MME 315 can send an update location request 440 to the visited Diameter edge agent 320, who passes it along 445 to the home Diameter edge agent 220. The update location request is then passed 450 to the HSS 210. The update location request communications between the MME 315 and the HSS 210 (440, 445, 450), in addition to other communications between the MME 315 and the HSS 210, may be sent using the S6a protocol and may include, among other parameters, an identification of the VPMN 300 in which the user is attempting to roam.

The HSS 210, after receiving the update location request 450, retrieves the user profile 125 and responds back to the Diameter edge agent 220 with the update location answer message 455. The update location answer message 455 includes information identifying the VPMN 300 in which the user is roaming, as well as the user profile with the definitions for all the subscribed APNs.

In this example, the home Diameter edge agent 220 creates a roaming user profile 225. The roaming user profile 225 is an altered update location answer message 460. Both the roaming user profile 225 and update location answer message 460 are based on a set of rules and policies to be applied for each VLMN 300 or for groups of VPMNs. The policies can be based on, for example, the terms of a roaming agreement the HPMN 200 has with the VPMN 300 (i.e., an agreement between the entities that own/operate the networks to allow roaming between the networks). The policies can include, on an APN (or group of APNs) basis: whether a particular APN is allowed or blocked while roaming in the specific VPMN 300; a replacement APN-Configuration Attribute-Value Pairs (AVP) to be applied; and a Configuration AVP defined in the policy, including but not limited to a Quality of Service (QoS) profile, AMBR (Aggregated Maximum Bit Rate) information, etc. The APN-Configuration AVP can define all configuration parameters for the APN (quality of service, data rate, etc). This term can take the definition provided in the 3GPP specification (see, 3GPP TS 29.272). Thus, the Diameter edge agent 220 can define as part of the policy, for a roaming user profile 225, a different APN configuration which replaces the APN received from the HSS 210 in the user profile 125.

Based upon the policy, the user profile 125 and/or the update location answer message 455 is modified by the home Diameter edge agent 220 before it gets sent to the visited MME 315, as modified update location answer message 460. For example, one modification can be that the APN-Configuration AVP received from the HSS 210 is overwritten by a replacement APN. Thus, all of the parameters for each VPMN 300 can ultimately be set in the home Diameter edge agent 220 and not in each user profile 125. This simplifies both the updating of parameters as agreements between the various networks change and ensures that each user profile transmitted to the visited network is up to date in a timely manner. Additionally, this saves memory in the HSS 210 since it only needs to store one set of profile information, which can be just the user's HPMN profile.

The modified update location answer message 460 is communicated to the visited Diameter edge agent 320 which passes it as message 465 to the MME 315. The visited MME 315 in turn uses the replaced profile information it receives to accept or deny packet data network (PDN) requests from the roaming mobile station 110 from the HPMN 200. For accepted PDN requests the MME 315 can share relevant parts of the APN-Configuration AVP with a serving gateway (SGW) (see FIG. 4) in the VPMN 300 and with a PDN Gateway ("PGW" see FIG. 4) typically located in the HPMN 200.

The home Diameter edge agent 220 can apply the same set of rules/policies to other S6a messages potentially carrying the user profile, such as an Insert Subscriber Data Request message. This message, for example, manages the subscription data of the user in a home MME (not illustrated). The Insert Subscriber Data message is not sent every time the mobile station 110 tries to register (unlike the Update Location message 440). This type of message can be used when certain changes are made at the HSS 210. Since the Insert Subscriber Data message carries the user profile 125, the Diameter edge agent 220 may also change the profile to a roaming user profile 225 (discussed below) in this message per the policy settings.

The messages exchanged between the visited MME 315 and the home HSS 210 may traverse one or more such Diameter agents. In one embodiment, the home Diameter edge agent 220 that alters the profile is the one under control of the HPMN 200. In alternate embodiments, the home Diameter edge agent 220 can be located within the HPMN 200 and/or can be a service hosted by the HPMN's IP Exchange (IPX) provider. As noted above, the Diameter edge agent 220 in the HPMN 200 can be either the first or only point of entry for a message from the VPMN 300. However, as noted in FIG. 4, there can be multiple Diameter edge agents located at or between the HPMN and the VPMN. Which Diameter edge agents 220, 320 communicate with each other and which Diameter edge agent 220 modifies the profile can change from network to network. Further, the determination of agents can be a function of the particular network providers.

In another example, the same logic in the home Diameter edge agent 220 can be implemented in the HSS 210. Thus, once the HSS 210 receives the update location request 450, it can access the original user profile 125, modify it in a similar fashion to that performed by the Diameter edge agent 220 discussed above to form a roaming user profile 225, and then transmit the modified update location answer message 455 containing the roaming user profile 225 to the Diameter edge agent 220. Thus, the user profile 125 does not contain any of the roaming parameters and is only modified for the update location answer message 455. Previously, longer profiles with roaming options for the user or multiple profiles based on individual VPMNs were used. In either embodiment, the HSS 210 does not store the modified profile in the database as a permanent part of the user's profile. Since the different requirements for a particular VPMN can change, the HSS 210, like the Diameter edge agent 220, stores the rules and sends the modified profile 225.

Figure 3A:
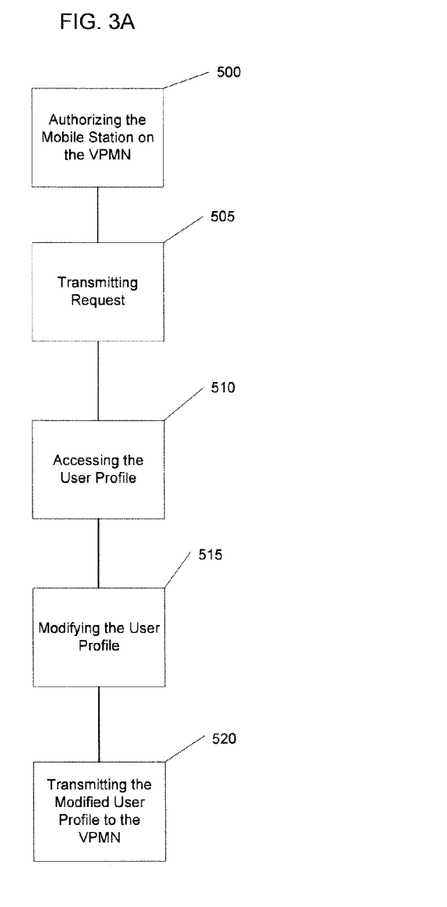
FIG. 3A is a flow diagram describing an example of the processing the user's profile for a VPMN.

FIG. 3A is a flow diagram describing an example of processing the user's profile for a VPMN. This illustrates an example of a method to revise the update location answer. A system can be used as described above, so the roaming MME 315 can communicate with the home HSS 210 to authorize the mobile station 110 on the VPMN 300 (step 500). After authorization, the MME 315 can transmit an update location request to the HSS 210, through one or more Diameter edge agents 320, 220 (step 505). The HSS 210 processes the request and accesses the user profile 125 (step 510). The user profile 125 is then modified based upon preset parameters to create a modified user profile for the particular VPMN 300 that made the request (step 515). In alternate examples, either the HSS 210 modifies the user profile 125 before sending the update location answer to the home Diameter edge agent 220, or the home Diameter edge agent 220 can alter the update location answer and modify the original profile sent by the HSS 210 (step 515). The modified update location answer 455, 460 is then transmitted to the roaming MME 315 to properly configure the mobile station's service in the VPMN 300 (step 520).

Figure 3B:
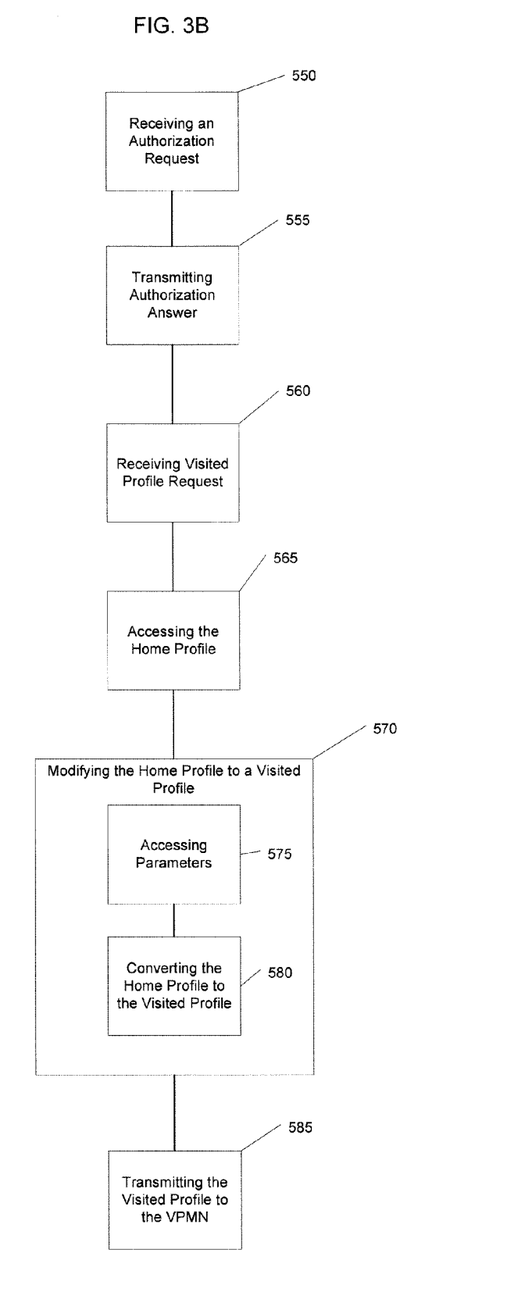
FIG. 3B is a flow diagram describing another example of providing a visited profile to a VPMN.

Another example of a method for providing information to the VPMN 300, as illustrated in FIG. 3B, includes the steps of receiving, at the HPMN 200, an authentication request 415 to authorize the mobile station 110 in the VPMN 300 (step 550). The HPMN 200 then transmits, to the VPMN 300, an authorization answer 420 in response to the authentication request 415 (step 555). In this example, the mobile station 110 is authorized to roam in the VPMN 300. Alternately, the HPMN 200 can deny the request.

Once authorized, the HPMN 200 receives a visited profile request 450 for the mobile station 110 located in the VPMN 300 (step 560). The request is transmitted from the VPMN 300. The HPMN 200 accesses a home profile 125 for the mobile station in the HPMN 200 (step 565). A system in the HPMN 200 modifies, the home profile 125 to a visited profile 225 (step 570). The visited profile 225 is then transmitted to the VPMN 300 (step 585).

In an example, the visited profile request can contain a visited network identifier. This identifier is unique to the particular VPMN 300 so the HPMN 200 knows how to modify the home profile 125. The modifying can include accessing parameters based on the visited network identifier (step 575) and converting the home profile 125 based on the parameters (step 580).

As noted previously, the parameters can be based on an agreement between the HPMN 200 and the VPMN 300. In an example, the parameters can be at least a list of Access Point Names (APNs).

As described above, the HPMN 200 contains the HSS 210 storing the home profile 125 and the home Diameter edge agent 220, which communicates with the HSS 210. The VPMN 300 includes the MME 315, which transmits the visited profile request, and the visited Diameter edge agent 320. The visited Diameter edge agent 320 communicates with the MME 315 and the home Diameter edge agent 220 to allow for the flow of the messages, requests and answers. One or more of these communications can be in the S6a protocol. In various embodiments, the HSS 210 or the home Diameter edge agent 220 in the HPMN 200 performs the modification.

The advantage of the examples is that the rules can be defined at the Diameter edge agent 220 for a VPMN 300 with a roaming agreement without impacting the provisioning information at the HSS 210. Therefore, changes to the APN roaming policies apply to all users without major re-provisioning efforts to the profiles 125 in the HSS 210. This allows a more granular control over APN usage while roaming. For example, the home network provider may decide not to allow the IMS APN to be used while roaming into a certain roaming partner network until the IMS footprint in that visited network reaches acceptable levels. Similarly, the home network provider may decide to allow an administrative APN to be used in networks when appropriate business agreements have been reached, for example with lower roaming tariffs, but to block it in certain countries if the roaming charges are excessive. This mechanism can also be used to police the QoS profile for each APN on a roaming agreement basis.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code for the intelligent messaging system. The software code is executable by the general-purpose computer that functions as a web server, application server(s) and/or MMEs, proxies, HHSs, etc. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to modify a home profile to a roaming profile, in essentially the manner performed in the implementations discussed and illustrated herein.

A wireless mobile communication network between the mobile station 110 and the base station 160 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile station 110 may be capable of conventional voice telephone communications and data communications. A variety of different types of mobile stations supporting such communications are widely available. Today, mobile stations typically take the form of portable handsets, smart-phones or personal digital assistants, although they may be implemented in other form factors.

Figures 5, 6:
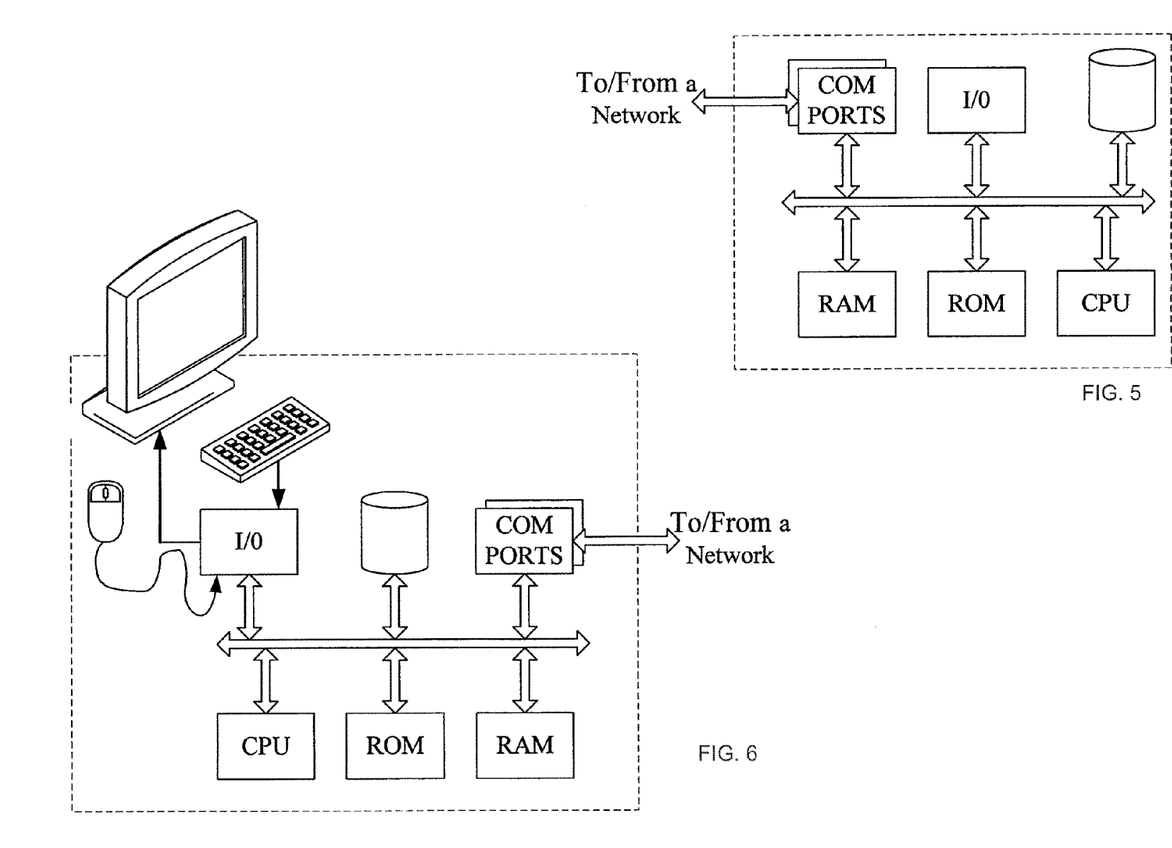
FIG. 5 is a simplified functional block diagram of a computer that may be configured to function as any of the systems of FIGS. 1 and 2.
FIG. 6 is a simplified functional block diagram of a personal computer or other work station or terminal device that may be configured to function as any of the systems of FIGS. 1 and 2.

FIGS. 5 and 6 provide functional block diagram illustrations of general purpose computer hardware platforms for at least the HSS. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers and terminal device computers are conventional in nature, and it is presumed that those skilled in the art are adequately familiar therewith. Of course, the server functions may be implemented in a distributed fashion on a number of similar platforms, to distribute the processing load.

Hence, aspects of the methods of APN adaptation, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable the transmission of the email message. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising the steps of:
   receiving, at a home network, from a visited network, a visited profile request including a visited network identifier, via an update location request for a mobile station in the visited network;
   retrieving, at the home network, a home profile for the mobile station in the home network;
   modifying, within the home network, the home profile to a visited profile, including,
      based on the visited network identifier, accessing within the home network, one or more access point names (APNs) configured to identify one or more packet data networks (PDNs), respectively, for mobile communications while within the visited network and further accessing one or more qualitative parameters, including a quality of service parameter, corresponding to one of the APNs within the home network;
      applying policies associated with the one APN and with one of the corresponding qualitative parameters; and
      based on the one accessed APN and the one corresponding accessed qualitative parameter and applied policies, creating the visited profile by converting the home profile into the visited profile within the home network, prior to transmitting the visited profile from the home network to the visited network,
wherein the one APN and the one corresponding qualitative parameter in the visited profile created within the home network are configured differently than in the home profile and the one qualitative parameter is configured to at least control access to the PDN identified by the one APN; and
transmitting the visited profile to the visited network in response to the visited profile request.

2. The method of claim 1, further comprising the steps of:
receiving, at the home network, from the visited network, an authentication request to authorize the mobile station in the visited network; and
transmitting, to the visited network, an authorization answer in response to the authentication request,
wherein the authentication request and the authorization answer are received and transmitted before receiving the visited profile request.

3. The method of claim 1, wherein the visited profile request comprises an authentication request to authorize the mobile station in the visited network, and
wherein the visited profile is transmitted with an authorization answer.

4. The method of claim 1, wherein the parameters are based on an agreement between the home network and the visited network.

5. The method of claim 1, wherein the accessed APNs are from a list of APNs that includes allowed APNs for mobile communications while within the visited network.

6. The method of claim 5, further comprising determining whether the list of APNs contains one or more APNs blocked for mobile communications while roaming in the visited network based on one of the qualitative parameters.

7. The method of claim 1, wherein the home network comprises:
a Home Subscriber Server (HSS) storing the home profile; and
a home Diameter edge agent communicating with the HSS, wherein the visited network comprises:
a Mobility Management Entity (MME) transmitting the visited profile request; and
a visited Diameter edge agent, communicating with one of the MME and the home Diameter edge agent,
wherein the HSS performs the retrieving step.

8. The method of claim 7, wherein the home Diameter edge agent performs the modifying step.

9. The method of claim 7, wherein the HSS performs the modifying step.

10. The method of claim 1, wherein the accessed parameters include at least one of a replacement APN-Configuration Attribute-Value Pair (AVP), or Aggregated Maximum Bit Rate (AMBR).

11. An article of manufacture, comprising:
at least one non-transitory machine readable storage medium; and
programming instructions embodied in said at least one medium for execution by one or more computers, wherein the programming configures said one or more computers to perform functions for providing information to a visited network, including functions to:
receive a visited profile request including a visited network identifier via an update location request for a mobile station in the visited network;
retrieve a home profile for the mobile station in a home network;
modify within the home network, the home profile to a visited profile, including,
based on the visited network identifier, accessing within the home network, one or more access point names (APNs) configured to identify one or more packet data networks (PDNs), respectively, for mobile communications while within the visited network and further accessing one or more qualitative parameters, including a quality of service parameter, corresponding to one of the APNs within the home network;
applying policies associated with the one APN and with one of the corresponding qualitative parameters; and
based on the one accessed APN and the one corresponding accessed qualitative parameter and applied policies, creating the visited profile by converting the home profile into the visited profile within the home network, prior to transmitting the visited profile from the home network to the visited network,
wherein the one APN and the one corresponding qualitative parameter in the visited profile created within the home network are configured differently than in the home profile and the one qualitative parameter is configured to at least control access to the PDN identified by the one APN; and
transmit the visited profile to the visited network in response to the visited profile request.

12. The article of claim 11, wherein the functions of the programming instructions further comprise functions to:
receive an authentication request to authorize the mobile station in the visited network; and
transmit an authorization answer in response to the authentication request,
wherein the instructions for the authentication request and instructions for the authentication answer are performed prior to receiving the visited profile request.

13. The article of claim 11, wherein the visited profile request comprises an authentication request to authorize the mobile station in the visited network, and
wherein the visited profile is transmitted with an authorization answer.

14. The article of claim 11, wherein the parameters are based on an agreement between the home network and the visited network.

15. The article of claim 11, wherein the accessed APNs are from a list of APNs that includes allowed APNs for mobile communications while within the visited network.

16. The article of claim 11, wherein the home network comprises:
a Home Subscriber Server (HSS) storing the home profile; and
a home Diameter edge agent communicating with the HSS, wherein the visited network comprises:
a Mobility Management Entity (MME) transmitting the visited profile request; and
a visited Diameter edge agent, communicating with the MME and the home Diameter edge agent,
wherein the HSS performs the retrieving.

17. The article of claim 16, wherein the home Diameter edge agent performs the modifying.

18. The article of claim 16, wherein the HSS performs the modifying.

* * * * *